(12) United States Patent
Karppi et al.

(10) Patent No.: US 10,590,604 B2
(45) Date of Patent: Mar. 17, 2020

(54) POLYMER PRODUCT IN PARTICLE FORM AND ITS USE

(71) Applicant: Kemira Oyj, Helsinki (FI)

(72) Inventors: Asko Karppi, Turku (FI); Matti Hietaniemi, Espoo (FI); Anneli Lepo, Tampere (FI); Kimmo Strengell, Espoo (FI)

(73) Assignee: Kemira Oyj, Helsinki (FI)

( * ) Notice: Subject to any disclaimer, the term of this patent is extended or adjusted under 35 U.S.C. 154(b) by 105 days.

(21) Appl. No.: 15/546,069

(22) PCT Filed: Jan. 26, 2016

(86) PCT No.: PCT/FI2016/050038
§ 371 (c)(1),
(2) Date: Jul. 25, 2017

(87) PCT Pub. No.: WO2016/120524
PCT Pub. Date: Aug. 4, 2016

(65) Prior Publication Data
US 2018/0016746 A1 Jan. 18, 2018

(30) Foreign Application Priority Data
Jan. 27, 2015 (FI) .................................. 20155058

(51) Int. Cl.
*D21H 17/45* (2006.01)
*D21H 21/18* (2006.01)
*D21H 17/37* (2006.01)
*D21H 21/10* (2006.01)
*D21H 17/42* (2006.01)
*D21H 17/44* (2006.01)
*C08F 220/56* (2006.01)

(52) U.S. Cl.
CPC ......... *D21H 17/455* (2013.01); *C08F 220/56* (2013.01); *D21H 17/37* (2013.01); *D21H 17/375* (2013.01); *D21H 17/42* (2013.01); *D21H 17/44* (2013.01); *D21H 21/10* (2013.01); *D21H 21/18* (2013.01)

(58) Field of Classification Search
None
See application file for complete search history.

(56) References Cited

U.S. PATENT DOCUMENTS

| | | | |
|---|---|---|---|
| 5,032,226 A | 7/1991 | Winiker | |
| 6,406,593 B1 | 6/2002 | Heard et al. | |
| 7,141,181 B2 | 11/2006 | Mori et al. | |
| 7,700,702 B2 | 4/2010 | Gaillard et al. | |
| 8,222,343 B2 | 7/2012 | Wright | |
| 2002/0066540 A1* | 6/2002 | Chen | ...................... D21H 21/10 162/17 |
| 2005/0242045 A1 | 11/2005 | Steiner | |
| 2011/0155339 A1* | 6/2011 | Brungardt | .............. D21H 21/18 162/164.6 |
| 2013/0139985 A1 | 6/2013 | Wright | |

FOREIGN PATENT DOCUMENTS

| | | |
|---|---|---|
| CN | 102031715 A | 4/2011 |
| CN | 102808353 A | 12/2012 |
| CN | 103161520 A | 6/2013 |
| CN | 104032621 A | 9/2014 |
| EP | 0484617 A1 | 5/1992 |
| EP | O 919 578 A1 * | 11/1997 |
| JP | 03211319 A | 9/1991 |
| JP | 2933474 B2 | 8/1999 |
| JP | 2000220092 A | 8/2000 |
| JP | 2002212899 A | 7/2002 |
| JP | 2006037290 A | 2/2006 |
| JP | 2007126771 A | 5/2007 |
| JP | 2007187821 A | 7/2007 |
| JP | 2012017537 A | 1/2012 |
| JP | 2012251252 A | 12/2012 |
| JP | 2013215708 A | 10/2013 |
| JP | 2014196588 A | 10/2014 |
| RU | 2298016 C2 | 4/2007 |
| RU | 2321599 C2 | 4/2008 |
| WO | 02060966 A1 | 8/2002 |
| WO | 2006016906 A1 | 2/2006 |
| WO | 2006044735 A2 | 4/2006 |
| WO | 2013124542 A1 | 8/2013 |
| WO | 2014076372 A1 | 5/2014 |

OTHER PUBLICATIONS

IP Australia, Examination Report No. 2 for standard patent application, dated Sep. 14, 2018, 6 pages.
Finnish Patent and Registration Office, Search Report, FI20155058, dated Aug. 21, 2015.

* cited by examiner

Primary Examiner — Robert T Butcher
(74) Attorney, Agent, or Firm — Berggren LLP

(57) ABSTRACT

The invention relates to a water-soluble polymer product in particle form, comprising amphoteric polyacrylamide, which is obtained by gel polymerisation of acrylamide together with anionic and cationic monomers. The amphoteric polyacrylamide has a mass average molecular weight MW of 1 500 000-6 000 000 g/mol, and a total ionicity of 4-15 mol-%, whereby the polymer product has a polymer content of at least 60 weight-%. The invention relates also to uses of the polymer product in paper and board making.

18 Claims, No Drawings

POLYMER PRODUCT IN PARTICLE FORM AND ITS USE

PRIORITY

This application is a U.S national application of PCT-application PCT/FI2016/050038 filed on Jan. 26, 2016 and claiming priority of Finnish national application number FI 20155058 filed on Jan. 27, 2015, the contents of all of which are incorporated herein by reference.

The present invention relates to a water-soluble polymer product in particle form, its use and a method for treating fibre stock in manufacture of paper and/or board according to the preambles of the enclosed independent claims.

In making of paper and board the use of inexpensive fibre sources, such as old corrugated containerboard (OCC) and other recycled paper and board grades, has been increasing over the past decades. Paper or board, which is made from stock comprising extensive amounts of recycled fibres, has typically low dry strength properties, because the quality of fibres is reduced during the recycling. Normally the low strength properties are improved by internal sizing with various polymers. However, the fibre stocks made from recycled fibre raw materials contain high amounts of anionic substances, so called anionic trash, which increases the consumption of the internal size, because the internal size polymers react with the anionic substances instead of fibres. At the same time the recycled fibres show relatively low charge levels, which means the interaction between the fibres and the internal size polymer is not as effective as with virgin fibres.

One important is aspect in treatment of stock comprising recycled fibres is the overall process economics. Products made of recycled fibres are normally low cost bulk products. Therefore it is not economically feasible to increase chemical costs during the fibre stock production over a certain level, and the costs from chemical additives are carefully weighed against the benefits which can be achieved and final product price. In other words dosage of the internal size polymer cannot be freely increased and/or effective but expensive polymers cannot be used if the final costs increase too much. Consequently there is a growing demand for effective strength improving agents, which are at the same time economically feasible.

Amphoteric polyacrylamde, which is a copolymer of acrylamide comprising both anionic and cationic groups, has been used as strength increasing sizing agent in papermaking industry. Amphoteric polyacrylamide is used in papermaking industry in solution form as a dispersion polymer, emulsion polymer or a solution polymer. However, dispersion polymers and solution polymers may be expensive to manufacture, and the polymer solutions have high transport and storage costs, in comparison to the amount of active polymer. Therefore they have not been a preferred alternative for manufacture of low cost paper and board products from recycled raw materials.

A disadvantage of solution polymer products is also their limited self-life, especially for polymers with low charge density. During storage the solution polymers are easily degraded in prevailing conditions, which decrease the amount of active polymer in the product. For example, microbial growth in the solution polymer product produces metabolism products, which can be detrimental to the quality of the polymer product. For example, microbes may produce clots, which cause problems in final paper or board. The low charge density of the product does not inhibit the microbial growth.

An object of this invention is to minimise or possibly even eliminate the disadvantages existing in the prior art.

Another object of the present invention is to provide a cost-effective and functional alternative for existing strength polymers and agents.

Yet another object of the present invention is to provide simple and effective method for manufacturing paper, board or the like with increased dry strength properties, such as burst strength and/or short span compression test (SCT) strength.

These objects are attained with the invention having the characteristics presented below in the characterising parts of the independent claims.

Some preferred embodiments of the invention are presented in the dependent claims.

Typical water-soluble polymer product according to the present invention, in particle form, comprises amphoteric polyacrylamide, which is obtained by polymerisation of acrylamide together with anionic and cationic monomers, and which amphoteric polyacrylamide has a mass average molecular weight MW of 1500000-6000000 g/mol, and a total ionicity of 4-15 mol-%, whereby the polymer product has a polymer content of at least 60 weight-%.

Typical method for treating fibre stock in manufacture of paper and/or board comprises dissolving water-soluble polymer product in particle form according to the present invention into water, whereby an aqueous treatment solution is obtained, adding the obtained treatment solution to a fibre stock, and forming a fibrous web.

Typical use of the water-soluble polymer product according to the present invention is as dry strength agent for paper or board.

Another typical use of the water-soluble polymer product according to the present invention is for preparing a surface size composition for paper or board.

Now it has been surprisingly found out that a polymer product in particle form, which comprises amphoteric polyacrylamide with carefully selected properties and produced by gel polymerisation, can be used as dry strength agent for paper and/or board in order to provide unexpected improvements in the dry strength. Polymer product according to the present invention is cost effective to produce and transport, while providing clear benefits in the dry strength properties of the final paper or board.

In the context of the present application the term "amphoteric polyacrylamide" denotes a polyacrylamide where both cationic and anionic groups are present in an aqueous solution at pH 7. Amphoteric polyacrylamide is obtained by copolymerisation of acrylamide or methacrylamide together with both anionic and cationic monomers. Preferably amphoteric polyacrylamide is obtained by copolymerisation of acrylamide together with both anionic and cationic monomers.

In the context of the present application the term "particle form" denotes discrete solid particles or granules. According to one embodiment of the invention the polymer product comprises particles or granules of amphoteric polyacrylamide, which have an average particle size of <2.5 mm, preferably <2.0 mm, more preferably <1.5 mm. These particles are obtained by subjecting the obtained polymer gel to mechanical comminution, such as cutting, milling, shredding, chopping or the like.

The term "water-soluble" is understood in the context of the present application that the polymer product, and consequently the amphoteric polyacrylamide, is fully miscible with water. When mixed with excess of water, the amphoteric polyacrylamide in the polymer product is preferably fully dissolved and the obtained polymer solution is preferably essentially free from discrete polymer particles or granules. Excess of water means that the obtained polymer solution is not a saturated solution.

According to one preferable embodiment the amphoteric polyacrylamide is a linear polyacrylamide. In other words, the amphoteric polyacrylamide is unbranched and preferably not crosslinked. In the gel polymerisation the amount of cross-linker is less than 0.002 mol-%, preferably less than 0.0005 mol-%, more preferably less than 0.0001 mol-%. According to one embodiment the gel polymerisation is completely free of cross-linker. The linear amphoteric polyacrylamide reduces effectively the possibility for insoluble polymer particles, which could reduce the quality of the produced paper or board.

According to one embodiment 10-95%, preferably 30-90%, more preferably 50-85%, even more preferably 60-80%, of the charged groups in the amphoteric polyacrylamide structure are cationic.

According to one preferable embodiment of the invention the amphoteric polyacrylamide in the polymer product has a cationic net charge. This means that the net charge of the amphoteric polyacrylamide remains positive, even if it contains anionic groups. Cationic net charge improves the interaction of the amphoteric polyacrylamide with the fibres in the stock. The net charge of the amphoteric polyacrylamide is calculated as the sum of the charges of the cationic and anionic groups present.

The solids content of the amphoteric polyacrylamide product according to the present invention may be >80 weight-%, preferably >85 weight-%, more preferably in the range of 80-97 weight-%, even more preferably 85-95 weight-%. The high solids content is beneficial in view of storage and transport properties of the polymer product.

The mass average molecular weight (MW) of the amphoteric polyacrylamide may be in the range of 1500000-6000000 g/mol, preferably 2000000-5000000 g/mol, more preferably 2500000-4500000 g/mol, even more preferably 2700000-4300000 g/mol. According to one preferred embodiment the mass average molecular weight (MW) of the amphoteric polyacrylamide is in the range of 2000000-4500000 g/mol. It has been observed that when the average molecular weight of the amphoteric polyacrylamide is >2000000 g/mol it provides good attachment and bridging between the fibres in the stock. Similarly, it has been observed that when the average molecular weight is less than 6000000 g/mol, the fibres are more evenly spaced and the formation of the web is not disturbed. In this application the value "mass average molecular weight" is used to describe the magnitude of the polymer chain length. Mass average molecular weight values are calculated from intrinsic viscosity results measured in a known manner in 1N NaCl at 25° C. by using an Ubbelohde capillary viscometer. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M^a$, where $[\eta]$ is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide). Accordingly, value of parameter K is 0.0191 ml/g and value of parameter "a" is 0.71. The average molecular weight range given for the parameters in used conditions is 490000-3200000 g/mol, but the same parameters are used to describe the magnitude of molecular weight also outside this range. pH of the polymer solutions for intrinsic viscosity determination is adjusted to 2.7 by formic acid to avoid probable poly-ion complexation of amphoteric polyacrylamides.

According to one embodiment of the invention the polymer content in the amphoteric polyacrylamide product is in the range of 60-98 weight-%. According to one preferable embodiment of the invention the polymer content in the amphoteric polyacrylamide product is in the range of 70-98 weight-%, preferably 75-95 weight-%, more preferably 80-95 weight-%, even more preferably 85-93 weight-%. Because the polymer content of the polymer product is high, naturally the amount of active amphoteric polyacrylamide is also high. This has a positive impact on transport and storage costs of the polymer product. Moisture content of the polymer product is typically 5-12 weight-%.

The amphoteric polyacrylamide in the polymer product may comprise at least 85 mol-% structural units derived from acrylamide and/or methacrylamide monomers and <15 mol-% of structural units originating anionic and cationic monomers. The percentage values are calculated from the total dry weight of the polymer. The total ionicity of the amphoteric polyacrylamide is in the range of 4-15 mol-%, preferably 5-13 mol-%, more preferably 6-12 mol-%, even more preferably 6-10 mol-%. Total ionicity includes all groups having ionic charge in the amphoteric polyacrylamide, most of the charged groups originating from the ionic monomers, but including also other charged groups originating from chain termination agents or the like. It has been observed that it is beneficial when the total ionicity of the polymer for strength enhancing purposes is <15 mol-%, especially when the average molecular weight of the polymer is 2000000-6000000 g/mol. If the ionicity is higher, the polymer may have a tendency to flocculate anionic trash and other disturbing substances in the stock instead of providing a good attachment between the fibres. The ionicity is carefully selected in order to provide maximal strength for the final paper/board product, good formation of the web. Furthermore, the ionicity is optimized in view of avoiding the zeta potential problems in the stock, i.e. positive zeta potential values.

According to one embodiment of the invention 10-90%, preferably 30-90%, more preferably 50-85%, even more preferably 60-80%, of the charged groups in the amphoteric polyacrylamide are cationic.

The cationic groups in the amphoteric polyacrylamide may originate from monomers selected from 2-(dimethylamino)ethyl acrylate (ADAM), [2-(acryloyloxy)ethyl] trimethylammonium chloride (ADAM-Cl), 2-(dimethylamino) ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC). Preferably the cationic groups in the amphoteric polyacrylamide may originate from monomers selected from [2-(acryloyloxy)ethyl] trimethylammonium chloride (ADAM-Cl), [3-(acryloylamino)propyl] trimethylammonium chloride (APTAC), and [3-(methacryloylamino)propyl]

trimethylammonium chloride (MAPTAC). More preferably the cationic monomer is [2-(acryloyloxy)ethyl] trimethylammonium chloride (ADAM-Cl).

The anionic groups in the amphoteric polyacrylamide originate from monomers selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid. Preferably the anionic groups originate from acrylic acid or itaconic acid.

According to one preferable embodiment the amphoteric polyacrylamide has a net cationic charge.

The amphoteric polyacrylamide of the polymer product is obtained by gel polymerisation. According to one embodiment, this preparation process of the polymer product in particle form, which comprises the amphoteric polyacrylamide, may use a reaction mixture comprising non-ionic monomers, such as acrylamide, and the charged anionic and cationic monomers. The monomers in the reaction mixture are polymerised in presence of initiator(s) by using free radical polymerisation. The temperature in the beginning of the polymerisation may be less than 40° C., sometimes less than 30° C. Sometimes the temperature in the beginning of the polymerisation may be even less than 5° C. The free radical polymerisation of the reaction mixture produces amphoteric polyacrylamide, which is in gel form or highly viscous liquid. After the gel polymerisation, the obtained amphoteric polyacrylamide in gel form is comminuted, such as shredded or chopped, as well as dried, whereby a particulate polymer product is obtained. Depending on the used reaction apparatus, shredding or chopping may be performed in the same reaction apparatus where the polymerisation takes place. For example, polymerisation may be performed in a first zone of a screw mixer, and the shredding of the obtained polymer is performed in a second zone of the said screw mixer. It is also possible that the shredding, chopping or other particle size adjustment is performed in a treatment apparatus, which is separate from the reaction apparatus. For example, the obtained hydrosoluble, i.e. water-soluble, polymer may be transferred from the second end of a reaction apparatus, which is a belt conveyor, through a rotating hole screen or the like, where it is shredded or chopped into small particles. After shredding or chopping the comminuted polymer is dried, milled to a desired particle size and packed for storage and/or transport.

According to one embodiment of the invention the polymer product is obtained by gel polymerisation process, where content of non-aqueous solvent in the reaction mixture is less than 10 weight-%, preferably less than 5 weight-%, more preferably less than 3 weight-%.

According to one embodiment of the invention the polymer product is obtained by gel polymerisation, where the content of monomers in the reaction mixture at the start of the polymerisation is at least 29 weight-%, preferably at least 30 weight-%, more preferably at least 32 weight-%.

When used, the water-soluble polymer product in particle form is dissolved into water, whereby an aqueous treatment solution is obtained. The polymer content of the said aqueous treatment solution may be 0.1-4 weight-%, preferably 0.3-3 weight-%, more preferably 0.5-2 weight-%.

The aqueous treatment solution comprising amphoteric polyacrylamide may then be added to the fibre stock, preferably to the thick stock, as a wet end chemical. Thick stock is here understood as a fibrous stock or furnish, which has consistency of at least 20 g/l, preferably more than 25 g/l, more preferably more than 30 g/l. According to one embodiment, the addition of the treatment solution is located after the stock storage towers, but before thick stock is diluted in the wire pit (off-machine silo) with short loop white water. When used as a wet end chemical, the amphoteric polyacrylamide may be used in amount of 100-2000 g/ton produced paper or board, preferably in the range of 300-1500 g/ton produced paper or board, more preferably in the range of 400-900 g/ton produced paper or board.

The aqueous treatment solution comprising amphoteric polyacrylamide may also be used for preparing a surface size composition for paper or board. In this embodiment the treatment solution is mixed with starch solution, optionally with other treatment agents, such as hydrophobisation agent(s). The starch component may be any suitable starch used in surface sizing, such as potato, rice, corn, waxy corn, wheat, maize, barley or tapioca starch, preferably corn or maize starch. The starch may have an amylose content of >10%, preferably >15%, more preferably >20%. According to one preferable embodiment of the invention the amylose content of the starch may be in the range of 10-80%, preferably 15-40%, more preferably 25-35%, determined by using iodine affinity procedures. Starch component is preferably degraded and dissolved starch. Starch component may be enzymatically or thermally degraded starch or oxidized starch. The starch component may be degraded uncharged native starch or slightly anionic oxidized starch, preferably degraded uncharged native starch. According to one embodiment the starch component may be slightly cationic oxidized surface size starch.

The obtained surface size is applied on the paper or board web surface by using known sizing apparatuses and devices, such as film press, puddle or pond size press or spray application. When used as a surface size additive, the amphoteric polyacrylamide may be used in amount of 500-5000 g/ton produced paper or board, preferably in the range of 1000-3000 g/ton produced paper or board, more preferably in the range of 1500-2500 g/ton produced paper or board.

In the present context, and as used above, the term "fibre stock" is understood as an aqueous suspension, which comprises fibres and optionally fillers. The fibre stock may comprise at least 5%, preferably 10-30%, more preferably 11-19% of mineral filler. The amount of mineral filler is calculated by drying the stock, and measuring the ash content by using standard ISO 1762, at temperature 525° C. is used for ash content measurements. Mineral filler may be any filler conventionally used in paper and board making, such as ground calcium carbonate, precipitated calcium carbonate, clay, talc, gypsum, titanium dioxide, synthetic silicate, aluminium trihydrate, barium sulphate, magnesium oxide or their any of mixtures. According to one preferable embodiment of the invention the treatment solution comprising amphoteric polyacrylamide is added to fibre stock comprising recycled fibres. This means that the fibres in the fibre stock preferably originate from recycled paper or old corrugated containerboard (OCC). According to one preferred embodiment the fibre stock to be treated comprises at least 20 weight-%, preferably at least 50 weight-% of fibres originating from recycled paper or board. In some embodiments the fibre stock may comprise even >70 weight-%, sometimes even >80 weight-%, of fibres originating from recycled paper or board.

According to one preferable embodiment the amphoteric polyacrylamide is used as dry strength additive in board manufacture when producing paperboard like liner, fluting, folding boxboard (FBB), white lined chipboard (WLC), solid bleached sulphate (SBS) board, solid unbleached sulphate (SUS) board or liquid packaging board (LPB). Boards may have grammage from 120 to 500 g/m² and they may be based 100% on primary fibres, 100% on recycled fibres, or to any possible blend between primary and recycled fibres.

The papermaking agent composition is especially suitable for fibre thick stock having a zeta-potential value −35-−1 mV, preferably −10-−1, more preferably −7-−1 mV, measured with Mütek SZP-06 device, before the addition of the papermaking agent composition to the fibre stock.

The papermaking agent composition is especially suitable for manufacture of paper and/or board grades having an ash content before coating, if any, of >10%, preferably >15%, more preferably >20%. Standard ISO 1762, temperature 525° C. is used for ash content measurements.

EXPERIMENTAL

Some embodiments of the invention are described in the following non-limiting examples.
Production of Polymer Product
General Description of the Polymer Product Preparation Preparation of monomer solution is described for exemplary examples below and other monomer solutions are prepared in analogous manner. The used monomers and their proportions for each tested polymer product are given in Table 1.

After the monomer solution is prepared according to the description, the monomer solution is purged with nitrogen flow in order to remove oxygen. An initiator, 2-hydroxy-2-methylpropiophenone in polyethylene glycol-water (1:1 by weight), is added to the monomer solution, and the monomer solution is placed on a tray to form a layer of about 1 cm under UV-light. UV-light is mainly on the range 350-400 nm, for example light tubes Philips Actinic BL TL 40 W can be used. Intensity of the light is increased as the polymerization proceeds to complete the polymerization. The first 10 minutes the light intensity is 550 µW/cm², and following 30 minutes it is 2000 µW/cm². The obtained gel is run through an extruder and dried to a moisture less than 10% at temperature of 60° C. The dried polymer is ground and sieved to particle size 0.5-1.0 mm.
Preparation of Monomer Solution AD7-AC2 A Monomer solution is prepared by mixing 248.3 g of 50% acrylamide solution, 0.01 g of 40% DTPA Na-salt solution, 2.9 g of sodium gluconate, 4.4 g of dipropylene glycol, 1.9 g of adipic acid, and 7.2 g of citric acid in a temperature controlled laboratory glass reactor at 20-25° C. The mixture is stirred until solid substances are dissolved. To the solution is added 32.6 g of 80% ADAM-Cl. pH of the solution is adjusted to 3.0 with citric acid, and 2.8 g of acrylic acid is added to the solution. pH is adjusted to be 2.5-3.0. The initiator solution is 5 ml of 6% 2-hydroxy-2-methylpropiophenone in polyethylene glycol-water (1:1 by weight) solution. The preparation is continued as described in the general description above.

Preparation of Monomer Solution M8-AC2.5 A

Monomer solution is prepared by mixing 224.4 g of 50% acrylamide solution, 0.01 g of 40% DTPA Na-salt solution, 2.7 g of sodium gluconate, 1.7 g of adipic acid, and 6.5 g of citric acid in a temperature controlled laboratory glass reactor at temperature of 20-25° C. The mixture is stirred until solid substances are dissolved. To the solution is added 62.4 g of 30% MAPTAC. pH of the solution is adjusted to 3.0 with citric acid, and 2.6 g of acrylic acid is added to the solution. pH is adjusted to be 2.5-3.0. The initiator solution is 6.5 ml of 12% 2-hydroxy-2-methylpropiophenone in polyethylene glycol-water (1:1 by weight) solution. The preparation is continued as described in the general description above.
Preparation of Monomer Solution AD7-IT3

Monomer solution is prepared by mixing 244.1 g of 50% acrylamide solution, 0.01 g of 40% DTPA Na-salt solution, 2.9 g of sodium gluconate, 4.3 g of dipropylene glycol, 1.8 g of adipic acid, and 7.0 g of citric acid in a temperature controlled laboratory glass reactor at temperature of 20-25° C. The mixture is stirred until solid substances are dissolved. To the solution is added 32.4 g of 80% ADAM-Cl. pH of the solution is adjusted to 3.0 with additional citric acid, and 7.5 g of itaconic acid is added to the solution. pH is adjusted to be 2.5-3.0. The initiator solution is 5 ml of 6% 2-hydroxy-2-methylpropiophenone in polyethylene glycol-water (1:1 by weight) solution. The preparation is continued as described in the general description above.
Preparation of Monomer Solution M8-AC2.5 B Monomer solution is prepared by mixing 224.4 g of 50% acrylamide solution, 0.01 g of 40% DTPA Na-salt solution, 2.7 g of sodium gluconate, and 1.7 g of adipic acid in a temperature controlled laboratory glass reactor at temperature of 20-25° C. The mixture is stirred until solid substances are dissolved. To the solution is added 62.4 g of 30% MAPTAC. pH of the solution is adjusted to 3.0 with 37 hydrochloric acid, and 3.2 g of acrylic acid is added to the solution. pH is adjusted to be 2.5-3.0. The initiator solution is 6.5 ml of 12% 2-hydroxy-2-methylpropiophenone in polyethylene glycol-water (1:1 by weight) solution. The preparation is continued as described in the general description above.

Intrinsic viscosities of the polymer products were determined by Ubbelohde capillary viscometer in 1 M NaCl at 25° C. pH of the polymer solution for capillary viscosity determination was adjusted to 2.7 by formic acid to avoid impact of probable poly-ion complexation for viscosity. Molecular weights were calculated using "K" and "a" parameters of polyacrylamide. The value of parameter "K" is 0.0191 ml/g and the value of parameter "a" is 0.71. Determined intrinsic viscosity values and calculated molecular weight values for the tested polymer products are also given in Table 1.

TABLE 1

Monomers, their proportions, intrinsic viscosity values and calculated molecular weight values for tested polymer products.

| Polymer product | Acrylamide (mol-%) | ADAM-Cl (mol-%) | MAPTAC (mol-%) | Acrylic acid (mol-%) | Itaconic acid (mol-%) | Intrinsic viscosity (dl/g) | MW based on intrinsic viscosity (Mg/mol) |
|---|---|---|---|---|---|---|---|
| M8-AC2.5 A | 89.5 | — | 8 | 2.5 | — | 7.1 | 2.8 |
| M8-AC2.5 B | 89.5 | — | 8 | 2.5 | — | 6.8 | 2.6 |

TABLE 1-continued

Monomers, their proportions, intrinsic viscosity values and calculated molecular weight values for tested polymer products.

| Polymer product | Acrylamide (mol-%) | ADAM-Cl (mol-%) | MAPTAC (mol-%) | Acrylic acid (mol-%) | Itaconic acid (mol-%) | Intrinsic viscosity (dl/g) | MW based on intrinsic viscosity (Mg/mol) |
|---|---|---|---|---|---|---|---|
| AD7-AC2 A | 91 | 7 | — | 2 | — | 7.2 | 2.8 |
| AD7-AC2 B | 91 | 7 | — | 2 | — | 6.1 | 2.4 |
| M8-AC2.5 C | 89.5 | — | 8 | 2.5 | — | 7.4 | 3.1 |
| M5-AC5 | 90 | — | 5 | 5 | — | 7.9 | 3.3 |
| AD7-AC2 C | 91 | 7 | — | 2 | — | 8.5 | 3.5 |
| AD7-AC2 D | 91 | 7 | — | 2 | — | 9.9 | 4.4 |
| AD7-IT3 | 90 | 7 | — | — | 3 | 5.2 | 1.7 |

Comparative Polymer Products

Commercial polymer products were used as comparative polymer products. Molecular weights of polymer solutions of comparative polymer products were determined by size exclusion chromatography, SEC, calibrated with polyethylene oxide 430-1015000 g/mol narrow molecular weight calibration standards. Molecular weight of dry cationic polyacrylamide was approximated based on intrinsic viscosity, in the same manner as for the test polymer products. Molecular weight of dry polyvinylformamide/polyvinylamine polymer (VF60-VAM40) was determined by size exclusion chromatography, SEC, calibrated with polyethylene oxide. Molecular weight value of VF60-VAM40 is an assessment, because the value was above the calibration standards. Used monomers, their proportions, intrinsic viscosity values and calculated molecular weight values of the reference polymer products are given in Table 2.

TABLE 2

Monomers, their proportions, intrinsic viscosity values and calculated molecular weight values of the reference polymer products

| Reference polymer product | Acrylamide (mol-%) | ADAM-Cl (mol-%) | Acrylic acid (mol-%) | N-vinyl-formamide (mol-%) | Vinyl-amine (mol-%) | Intrinsic viscosity (dl/g) | MW based on intrinsic viscosity (Mg/mol) | MW, SEC (Mg/mol) |
|---|---|---|---|---|---|---|---|---|
| AD10-AC5 | 85 | 10 | 5 | — | — | — | — | 0.8 |
| AD5 | 95 | 5 | — | — | — | 8.5 | 3.5 | |
| VF60-VAM40 | — | — | — | 60 | 40 | — | — | ~4 |
| VF55-VAM45 | — | — | — | 55 | 45 | — | — | 0.6 |
| AC8 | 92 | — | 8 | — | — | — | — | 0.4 |

Technical Performance Examples

Technical performance of test polymer products and comparative reference polymer products was tested with different pulp and sheet studies. Used pulp and sheet testing devices and standards are given in Table 3.

TABLE 3

Pulp and sheet testing devices and standards.

| Property/Measurement | Device/Standard |
|---|---|
| pH | Knick Portamess 911 |
| Turbidity (NTU) | WTW Turb 555IR |
| Conductivity (mS/cm) | Knick Portamess 911 |
| Charge (µekv/l) | Mütek PCD 03 |
| Zeta potential (mV) | Mütek SZP-06 |
| Consistency (g/l) | ISO 4119 |
| Ash content (%) | ISO 1762 |
| Basis weight | Mettler Toledo/ISO 536 |
| Ash content, 525° C. | ISO 1762 |
| SCT Index (Short Span Compression test) | Lorentzen & Wettre Compression Strength tester/ISO 9895 |
| Burst strength | IDM Test EM-50/80/ISO 2758 |
| CMT30 Index | Sumet-Messtechnik SC-500 Fluter: PTA Group AV-S/ISO 7263: 1994 |
| Cobb60 | ISO 535 |
| Tensile strength | Lorentzen & Wettre Tensile tester/ISO 1924-3 |

Performance Example 1: Dry Strength of Testliner Handsheets

Commercial Central European Old Corrugated Container (OCC) stock was used as raw material. Stock had been separated into long fibre (LF-) fraction and short fibre (SF-) fraction by a screen fractionation process already at the mill. Mixed pulp comprising both fractions, as well as the white water and clear filtrate were characterized and the results are shown in annexed Table 4.

TABLE 4

Characteristics of the stock used in Performance Example 1.

| Characteristic | Mixed pulp | White water | Clear filtrate |
|---|---|---|---|
| pH | 6.54 | 6.36 | 5.1 |
| Turbidity, NTU | 744 | 629 | 634 |

TABLE 4-continued

Characteristics of the stock used in Performance Example 1.

| Characteristic | Mixed pulp | White water | Clear filtrate |
|---|---|---|---|
| Conductivity, mS/cm | 3.76 | 3.74 | 2.86 |
| Charge density, µeq/l | 219 | 176 | 156 |
| Zeta-potential, mV | 4.75 | — | — |
| Consistency, g/l | 9.4 | 2.8 | 0.2 |
| Ash of dry solids, % | 10.5 | 34.9 | 24.5 |

Each polymer product to be tested was added to the stock in a mixing jar under mixing with 1000 rpm. After polymer product addition the mixing was continued for 1 min, white water (⅓) was added to pulp (⅔) 30 s before sheet preparation and mixing was continued at 1000 rpm for 30 s until the stock suspension was ready for the sheet preparation. Retention aid Fennopol K3400R (Kemira Oyj) was added at dosage about 100 g/t 10 s before sheet preparation. The polymer product was thus allowed total reaction time of 90 s before sheet preparation. Basis weight of the sheet was adjusted by changing the retention aid dosage. Retention aid dosage of the reference was 100 g/t.

For the preparation of laboratory sheets the stock was diluted to 1% consistency with clear filtrate (CF). Handsheets having basis weight of 120 g/m² were formed by using Rapid Köthen sheet former with circulation water in accordance with ISO 5269-2:2012. The amount of stock portion (240 ml) was kept constant. The sheets were dried in vacuum dryers for 6 minutes at 92° C. and at 1000 mbar.

The used circulation water was prepared in a separate container, where the conductivity and hardness of tap water were adjusted with $CaCl_2$ and NaCl to correspond white water of a paper mill.

Before testing the prepared laboratory sheets were pre-conditioned for 24 h at 23° C. in 50% relative humidity, according to ISO 187.

Polymer products, their dosage levels as well as the obtained SCT strength results for the prepared handsheets are given in Table 5.

TABLE 5

Polymer products, their dosage levels as well as the obtained SCT strength results for the prepared handsheets.

| Polymer product | Dosage, kg/ton dry pulp | SCT Index (10% ash), Nm/g | Remark |
|---|---|---|---|
| None | — | 26.0 | Reference |
| AD7-AC2 B | 0.3 | 26.6 | |
| AD7-AC2 B | 0.5 | 26.0 | |
| M8-AC2.5 C | 0.3 | 26.3 | |
| M8-AC2.5 C | 0.5 | 26.4 | |
| M5-AC5 | 0.3 | 26.5 | |
| M5-AC5 | 0.5 | 27.1 | |
| AD7-AC2 C | 0.3 | 26.3 | |
| AD7-AC2 C | 0.5 | 27.2 | |
| AD7-AC2 A | 0.3 | 27.3 | |
| AD7-AC2 A | 0.5 | 26.9 | |
| AD10-AC5 | 0.3 | 26.3 | Comparative |
| AD10-AC5 | 0.5 | 26.3 | Comparative |

It can be seen from Table 5 that amphoteric dry polymer products enhance SCT strength of the handsheets in comparison to solution amphoteric polymers. The best SCT strengths are obtained with net cationic amphoteric dry polymer products having molecular weight of 2800000 g/mol (AD7-AC2 A) and molecular weight of 3500000 g/mol (AD7-AC2 C) as well as with net neutral amphoteric dry polymer product having molecular weight of 3300000 g/mol (M5-AC5).

Performance Example 2: Pilot Machine Study

Commercial Central European Old Corrugated Container (OCC) stock from Central Europe was used as raw material. OCC was disintegrated from bales by using Andritz laboratory refiner for 35 minutes with open fillings. The bales were disintegrated with mill water to achieve consistency of 2.3% for the test stock suspension.

Polymer product was dosed into the disintegrated OCC thick stock. Fresh mill water was used as process water which was fed into a mixing tank with the stock under agitation, the stock was diluted to headbox consistency of 1%, and the thin stock suspension was fed to a headbox of a pilot paper machine. The used retention aids were 1) cationic copolymer of acrylamide, molecular weight about 6,000,000 g/mol, charge 10 mol-% (C-PAM), dosage of 100 g/ton of dry product, and 2) colloidal silica, average particle size 5 nm, dosage of 200 g/ton of dry product. C-PAM was added before the headbox pump of the pilot paper machine, whereas silica was dosed before the headbox of the pilot paper machine. The properties of the headbox stock are given in Table 6.

TABLE 6

Properties of the headbox stock used in Performance Example 2.

| Characteristic | Headbox stock |
|---|---|
| pH | 7.8 |
| Conductivity, mS/cm | 1.36 |
| Zeta-potential, mV | −10.7 |
| Charge density, µeq/l | −277 |
| Consistency, g/l | 3.0 |

OCC liner and fluting sheets having basis weight of 100 g/m² were produced on a pilot paper machine. Operational parameters of the pilot paper machine were as follows:

Running speed: 2 m/min; Web width: 0.32 m; Rotation speed of holey roll: 120 rpm; Press section: 2 nips; Drying section: 8 pre-drying cylinders, baby cylinder, 5 drying cylinders Before testing of strength properties of the produced liner and fluting sheets, they were pre-conditioned for 24 h at 23° C. in 50% relative humidity according to standard ISO 187. Devices and standards, which were used to measure the properties of the sheets, are given in Table 3.

Dosage amounts of polymer products and results for strength property tests are given in Table 7. Strength results are indexed and compensated to the same ash content in order to make a representative comparison between the tested polymer products. Tensile and SCT measurements were indexed by dividing each obtained measurement value by basis weight of the measured sheet and then calculated as geometrical mean of machine direction strength and cross direction strength. The results were levelled to 16% ash content. The results were interpolated to 16% ash content based on the known data points. A difference of +1% unit in ash content corresponds to the difference of −0.25 Nm/g in the geometrical SCT index and to the difference of −0.75 Nm/g in the geometrical tensile index.

TABLE 7

Dosage amounts of polymer products and results for strength property tests for Performance Example 2.

| Polymer Product | Dosage, kg/ton | SCT index, 16% ash, Nm/g | Burst index, 16% ash, kPam$^2$/g | Tensile index, 16% ash, Nm/g |
|---|---|---|---|---|
| None | — | 20.9 | 1.74 | 35.2 |
| M8-AC2.5A | 0.5 | 23.3 | 2.01 | 38.5 |
| AD5 (Comparative) | 0.5 | 22.1 | 1.80 | 36.2 |
| VF60-VAM40, comparative | 0.5 | 21.8 | 1.98 | 37.4 |

Results of Performance Example 2 show that amphoteric net cationic dry polymer product having molecular weight of 2800000 g/mol enhance SCT strength, burst strength and tensile strength in comparison to reference polymer products comprising cationic polyacrylamide and polyvinylamine/polyvinylformamide co-polymer.

Performance Example 3: SCT and Burst Strength of Testliner Handsheets

Commercial Central European Old Corrugated Container (OCC) stock was used as raw material. Stock had been separated into long fibre (LF-) fraction and short fibre (SF-) fraction by a screen fractionation process already at the mill. Mixed pulp comprising both fractions, as well as the white water and clear filtrate were characterized and the results are shown in annexed Table 8.

TABLE 8

Characteristics of the stock used in Performance Example 3.

| Characteristic | Mixed pulp | White water | Clear filtrate |
|---|---|---|---|
| pH | 6.51 | 5.9 | 5.34 |
| Turbidity, NTU | >1000 | 891 | 515 |
| Conductivity, mS/cm | 3.18 | 3.37 | 2.82 |
| Charge density, µeq/l | −370 | −321 | −338 |
| Zeta-potential, mV | −3.50 | — | — |
| Consistency, g/l | 9.9 | 4.3 | 0.18 |
| Ash of dry solids, % | 13 | 43.5 | 9.0 |

Same C-PAM as in Performance Example 2 was used. Polymer product and C-PAM were added to the stock in a mixing jar under mixing with 1000 rpm. After addition of the polymer product and C-PAM the mixing was continued for 1 min, white water (⅓) was added to pulp (⅔) 30 s before sheet preparation and mixing was continued at 1000 rpm for 30 s until the stock suspension was ready for the sheet preparation. Retention aid Fennopol K3400R (Kemira Oyj) was added at dosage about 100 g/t 10 s before sheet preparation. The polymer product was thus allowed total reaction time of 90 s before sheet preparation. Basis weight was adjusted by changing retention aid dosage. Retention aid dosage of the reference was 100 g/t.

The preparation of laboratory handsheets and the used circulation water was carried out as described in Performance Example 1. Before testing the laboratory sheets were pre-conditioned for 24 h at 23° C. in 50% relative humidity, according to ISO 187.

Polymer products, their dosage levels as well as the obtained SCT strength index results and burst strength index at 14% ash content for the prepared handsheets are given in Table 9.

TABLE 9

Polymer products, their dosage levels as well as the obtained SCT strength results for the prepared handsheets.

| Polymer Product | Dosage kg/t (dry) | SCT index 14% ash, Nm/g | Burst index 14% ash, kPam$^2$/g |
|---|---|---|---|
| None | | 24.0 | 2.04 |
| AD7-AC2 | 0.4 | 24.1 | 2.23 |
| AD7-AC2 | 0.8 | 25.4 | 2.30 |
| VF55-VAM45, comparative | 0.4 | 23.8 | 2.16 |
| VF55-VAM45, comparative | 0.8 | 24.7 | 2.08 |

It can be seen from the results in Table 9 that the amphoteric dry polymer increases SCT and burst strength index in comparison to a commercial polyvinylformamide/polyvinylamine solution polymer.

Performance Example 4

Base paper was unsized testliner paper from a commercial paper mill, 120 g/m$^2$, 100% recycled fibre based liner grade.

Commercial surface size starch C*film 07311 (Cargill) was used, and the starch was cooked for 30 min at 15% concentration at 95° C. Commercial hydrophobization agent Fennosize S3000 (Kemira Oyj) was used in the size formula, 1 weight-% of dry surface size composition. A dry polymer product, dissolved to 1.5% concentration was added to the surface size composition. Surface size composition was mixed and stored at 70° C., minimum mixing was 2 min/experiment.

Size press parameters were as follows:
Size press manufacturer: Werner Mathis AG, CH 8155 Niederhasli/Zürich; Size press model: HF 47693 Type 350; Operation speed: 2 m/min; Operation pressure: 1 bar; Operation temperature: 60° C.; Sizing solution volume: 100 ml/test; Sizing times/sheet: 1.

Sizing is performed in machine direction and the surface size composition is applied as 12 weight-% solution.

Drying of the sized sheets was made in Rapid Köthen sheet dryer at 97° C. for 5 min.

The properties of the sized sheets were measured. The used measurements, testing devices and standards are given in Table 3. The indexed value is the strength divided by basis weight of the paper/board. The geometric (GM) value is the square root of (MD value)*(CD value). MD value is the measured strength value in machine direction and CD value is the measured strength value in machine cross direction. The measured values are given in Table 10.

TABLE 10

The measured values for Performance Example 4.

| Polymer product | Remark | Starch %-dry | Polymer dosage %-dry | SCT GM index Nm/g | Burst index kPam$^2$/g | Cobb60 g/m$^2$ |
|---|---|---|---|---|---|---|
| None | Ref. | 99 | — | 22.6 | 2.25 | 88 |
| AD10-AC5 | Comp. | 97 | 2 | 22.4 | 2.22 | 52 |

TABLE 10-continued

The measured values for Performance Example 4.

| Polymer product | Remark | Starch %-dry | Polymer dosage %-dry | SCT GM index Nm/g | Burst index kPam²/g | Cobb60 g/m² |
|---|---|---|---|---|---|---|
| AD7-AC2 B | | 97 | 2 | 23.7 | 2.36 | 45 |
| M8-AC2.5 A | | 97 | 2 | 22.7 | 2.34 | 38 |
| AD7-AC2 A | | 97 | 2 | 24.0 | 2.36 | 40 |
| AD7-AC2 C | | 97 | 2 | 23.5 | 2.30 | 30 |

It can be seen from results given in Table 10 that the amphoteric dry polymer products increase SCT strength and burst strength index values compared to amphoteric solution polymer and surface size starch as such. All amphoteric polymer provided improved hydrophobicity compared to surface starch and comparative polymer product. The amphoteric dry polymer product with the highest molecular weight had the most pronounced impact on hydrophobicity.

Performance Example 5: Drainage and Starch Retention Study

Commercial Old Corrugated Container (OCC) stock was used in this example to study drainage and starch retention. Fixative was commercial polyamine type cationic polymer Fennofix 50 (Kemira Oyj) and it was used in amount 1.4 kg/t. Amphoteric dry polymer product used was AD7-AC2 C.

Performance on drainage was tested with Dynamic Drainage Analyzer, DDA (AB Akribi Kemikonsulter, Sweden). DDA's vacuum and stirrer were calibrated and necessary adjustments to the settings were made. DDA was connected to a computer for measuring the time between an application of vacuum and the vacuum break point. A change of the vacuum expresses the forming time of a wet fibre web until air breaks through the thickening web indicating the drainage time. A drainage time limit was set to 30 seconds for the measurements.

In drainage measurements, 500 ml of the stock sample was measured into the reaction jar, and a wire with 0.25 mm openings and a 300 mbar vacuum were used. The drainage test was performed by mixing the sample stock with the stirrer at 1200 rpm for 30 seconds while the fixative and the polymer product were added in predetermined order.

Starch content of DDA filtrate was determined as follows:

Stock sample was filtered through a filter paper. 1.5 ml filtrate was taken into a measurement cuvette and 1.3 ml 1% hydrochloric acid was added. 7.2 ml deionized water was added to fill the 10 ml measurement cuvette. Absorbance was measured using Hach Lange DR 5000 spectrofotometer at wavelength 590 nm in the following manner: First reagent blank was recorded, then 100 µl Lugol's iodine solution was added, sample was mixed and absorbance was measured after 30 s. Starch concentration correlates linearly to the absorbance measure, viz., increasing absorbance indicates higher starch concentration.

Absorbance and DDA drainage results are given in Table 11.

TABLE 11

Absorbance and DDA drainage results for Performance Example 6

| Polymer Product | Polymer product dosage kg/t | Absorbance 590 nm | Drainage, DDAs |
|---|---|---|---|
| None | — | 0.85 | 20.1 |
| AD7-AC2 C | 0.7 | 0.73 | 16.3 |
| AD7-AC2 C | 1.4 | 0.70 | 13.7 |

The results in table 11 show that amphoteric dry polymer product have a positive impact on starch retention and drainage when used with a fixative polymer.

Performance Example 6: Dry Strength for Kraft Pulp

Impact of dry amphoteric polymer product for dry strength of kraft pulp was tested. The test was made in the following manner. Kraft thick stock was diluted with clear filtrate to consistency of 1%. Characteristics of the pulp, thick stock, clear filtrate and thick stock are given in Table 12. Fixative polymer in the test was commercial polyethyleneimine type polymer Retaminol 2S (Kemira Oyj) and it was added to pulp 120 s before sheet formation. Dry strength polymer product in the test was AD7-AC2 D and it was dosed 90 s before sheet formation. Both fixative and dry strength polymers were added to 1% pulp while mixing by 1000 rpm in DDJ. Pulp was diluted in 1:1 ratio with white water 30 s before sheet formation. Retention aid in the test was commercial cationic polyacrylamide Fennopol K 3400P (Kemira Oyj), and it was added to the pulp 10 s before sheet formation. Dosage of the retention agent was 200 g/ton in the reference.

TABLE 12

Characteristics of the pulp, thick stock, clear filtrate and thick stock used in Performance Example 6.

| Charasteristic | Kraft Pulp | Kraft Thick Stock | White Water | Clear Filtrate |
|---|---|---|---|---|
| pH | 7.20 | 7.64 | — | 7.5 |
| Turbidity, NTU | 82 | 136 | — | 44 |
| Conductivity, µS/cm | 2620 | 2640 | — | 2670 |
| Charge, µekv/l | −409 | −564 | — | −212 |
| Zeta potential, mV | −12.0 | −11.6 | — | |
| Consistency, g/l | 10.5 | 36.1 | 0.16 | |
| Ash, % | 1.3 | 1.2 | 30.3 | |

Handsheets having basis weight of 120 g/m² were formed by using Rapid Köthen sheet former. The sheets were dried in vacuum dryers for 6 minutes at 92° C. and at 1000 mbar. Before testing the sheets were pre-conditioned for 24 h at 23° C. in 50% relative humidity, according to ISO 187.

SCT strength and burst strength index were determined for the prepared handsheets and the obtained results are given in Table 13. Devices and standards, which were used to measure the properties of the sheets, are given in Table 3.

TABLE 13

SCT strength and burst strength index values for the prepared handsheets.

| Polymer Product | Polymer dosage kg/t dry | Fixative dosage kg/t dry | SCT index Nm/g | Burst index kPam$^2$/g |
|---|---|---|---|---|
| None | — | — | 37.3 | 5.91 |
| AD7-AC2 D | 0.6 | — | 39.2 | 5.95 |
| AD7-AC2 D | 0.9 | — | 37.8 | 6.44 |
| AD7-AC2 D | 0.6 | 0.125 | 38.4 | 6.31 |

The results of Table 13 show that amphoteric dry polymer product increase SCT and burst index values of kraft pulp. Fixative polymer can be used with the amphoteric polymer product.

Performance Example 7

The example was carried out by using the same procedure as in Performance Example 4, except that the base paper was commercial schrenz and the sizing composition is free from hydrophobization agents. Amphoteric dry polymer product was AD7-IT3 and Comparative reference polymer product was AC8, which is a commercial solution co-polymer of acrylamide and acrylic acid.

SCT GM index and CMT30 index were determined at 5% pick up level. SCT GM index was determined as described in Performance Example 4 and device standard for determination of CMT30 index is given in Table 3. The measured values are given in Table 14.

TABLE 14

SCT GM index and CMT30 index values

| Polymer Product | Remark | Polymer dosage %-dry | SCT GM index, Nm/g | CMT30 index, Nm$^2$/g |
|---|---|---|---|---|
| None | Reference | — | 22.7 | 1.13 |
| AC8 | Comparative | 2.5 | 24.4 | 1.26 |
| AD7-IT3 | | 1 | 23.2 | 1.24 |
| AD7-IT3 | | 2.5 | 24.9 | 1.31 |

The results in Table 14 show that amphoteric dry polymer product enhance effectively and cost-efficiently SCT strength and CMT30 strength of unhydrophobized surface sized paper.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A water-soluble polymer product in a particle form, comprising: amphoteric polyacrylamide obtained by gel polymerisation of acrylamide together with anionic and cationic monomers, and which amphoteric polyacrylamide has:
   a mass average molecular weight MW in a range of 2,500,000-4,500,000 g/mol, and
   a total ionicity of 4-15 mol-%,
   wherein the polymer product has a polymer content of at least 60 weight-%.

2. The polymer product according to claim 1, wherein the amphoteric polyacrylamide is a linear polyacrylamide.

3. The polymer product according to claim 1, wherein the polymer product has the polymer content in a range of 70-98 weight-%.

4. The polymer product according to claim 1, wherein the amphoteric polyacrylamide has a net cationic charge.

5. The polymer product according to claim 1, wherein 10-90% of the charged groups in the amphoteric polyacrylamide are cationic.

6. The polymer product according to claim 1, wherein the total ionicity of the amphoteric polyacrylamide is in a range of 5-13 mol-%.

7. The polymer product according to claim 1, wherein the cationic groups in the amphoteric polyacrylamide originate from monomers selected from 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC) or diallyldimethylammonium chloride (DADMAC), and/or the anionic groups in the amphoteric polyacrylamide originate from monomers selected from unsaturated mono- or dicarboxylic acids, being acrylic acid, maleic acid, fumaric acid, itaconic acid, aconitic acid, mesaconic acid, citraconic acid, crotonic acid, isocrotonic acid, angelic acid or tiglic acid.

8. The polymer product according to claim 1, wherein the polymer product has a particle size <2.5 mm.

9. A method for treating a fibre stock in paper and/or board making, the method comprising:
   dissolving the water-soluble polymer product in a particle form according to claim into water, whereby an aqueous treatment solution is obtained,
   adding the obtained treatment solution to the fibre stock, and
   forming a fibrous web.

10. The method according to claim 9, wherein the treatment solution is added to the fibre stock comprising recycled fibres, or to a thick stock.

11. The polymer product according to claim 1, wherein the mass average molecular weight of the amphoteric polyacrylamide is in a range of 2,700,000-4,300,000 g/mol.

12. The polymer product according to claim 1, wherein the polymer product has the polymer content in a range of 75-95 weight-%.

13. The polymer product according to claim 1, wherein the polymer product has the polymer content in a range of 80-95 weight-%.

14. The polymer product according to claim 1, wherein the polymer product has the polymer content in a range of 85-93 weight-%.

15. The polymer product according to claim 1, wherein 30-90% of the charged groups in the amphoteric polyacrylamide are cationic.

16. The polymer product according to claim 1, wherein 50-85% of the charged groups in the amphoteric polyacrylamide are cationic.

17. The polymer product according to claim 1, wherein 60-80% of the charged groups in the amphoteric polyacrylamide are cationic.

18. The polymer product according to claim 1, wherein the total ionicity of the amphoteric polyacrylamide is in a range of 6-12 mol-%.

\* \* \* \* \*